//

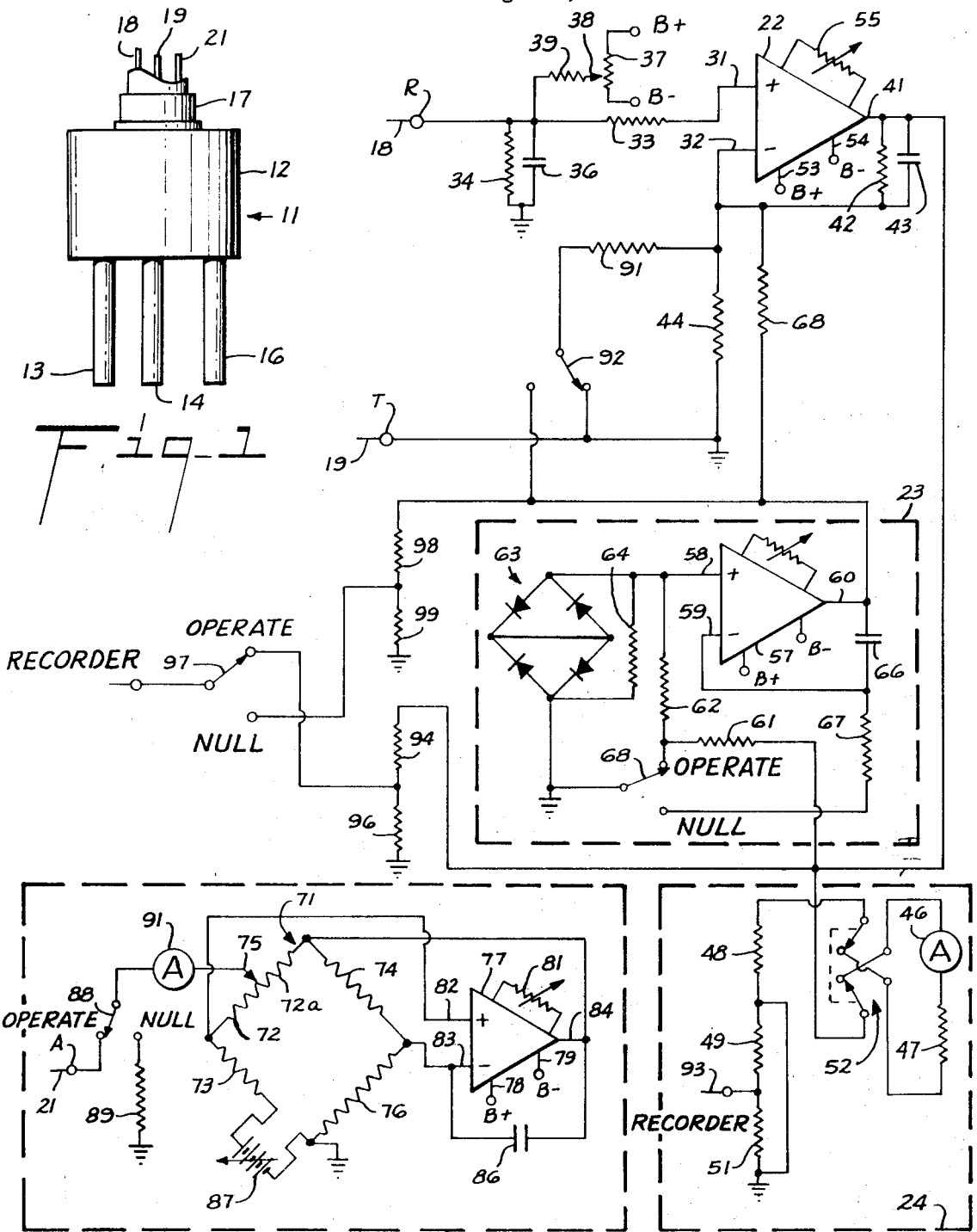

United States Patent Office 3,661,750
Patented May 9, 1972

3,661,750
CORROSION RATE METER
Homer M. Wilson, Houston, Tex., assignor to
Petrolite Corporation, St. Louis, Mo.
Filed Aug. 28, 1969, Ser. No. 853,640
Int. Cl. G01n 27/46
U.S. Cl. 204—195                    11 Claims

ABSTRACT OF THE DISCLOSURE

A corrosion rate meter with metallic electrodes contactable by a corrodent, including a test specimen electrode, a reference electrode, and a third or auxiliary electrode. A source of direct current passes between the test and third electrodes, at selected intervals, a predetermined, relatively constant current whereby a polarization potential is created between the test and reference electrodes. An isolation amplifier; with an input circuit between the test and reference electrodes, provides in its output circuit an output signal representative of the potential difference between these electrodes. A signal correction means applies a corrective signal to the input circuit of the isolation amplifier. The corrective signal removes from the output signal of the isolation amplifier any component representing the potential difference present between the test and reference electrodes intermediate the intervals of current flow creating the polarization potential. A readout means connects to the output circuit of the isolation amplifier to measure the output signal representative of the polarization potential (and corrosion rate) created between the test specimen and reference electrodes.

BACKGROUND OF THE INVENTION

(1) Field of the invention

This invention relates to measuring and testing corrosion processes and it relates particularly to the instruments and electro-chemical techniques used in the study of corrosion processes.

(2) Description of the prior art

It is often desirable to determine the rates at which metals corrode within a corrodent such as a corrosive liquid. For example, corrosion inhibitors are added to aqueous liquids to reduce the corrosion of exposed metals. Instruments are used to measure the rates at which these metals corrode so that the effectiveness of the inhibitor can be determined. The measurement of the rate of corrosion upon metals usually involves an instrument associated with a probe carrying metallic electrodes immersed within the corrodent. These instruments are usually termed "corrosion rate meters." The electrodes in the corrodent undergo certain electro-chemical changes that are related to the corrosion of the specimen metal forming the test electrode. The rate of corrosion can be correlated with the electro-chemical effects upon the metallic test (specimen) electrode contacted by the corrodent.

The corrosion of metallic materials by a corrodent causes the production of electrical energy by electro-chemical action. For example, two metallic electrodes immersed in a corrodent develop a potential difference as a result of half-cell effects. The potential at a freely corroding test electrode (no external current application) in a dynamic system where the corrosion products are either diffusing or dissolving, eventually reaches a certain steady-state potential differential relative to a reference electrode. This potential difference may be termed the freely corroding potential of the metallic test electrode forming the half-cell subjected to the corroding environment.

A metallic test electrode, which is subject to corrosion, may be polarized into a non-corroding state by passing direct current from an external source between the electrode and corrodent. The amount of current-induced change in electrical potential of the test electrode, with respect to a reference electrode, is termed as polarizing potential. The polarizing potential may be anodic or cathodic, depending upon the directional flow of current which produces the polarization potential. The polarization potential change, excluding the freely corroding potential of the electrode, may be readily determined by passing current flow through the electrode and corrodent. The polarization potential increments ($\Delta E$) may be plotted against the applied current increments ($\Delta I$) on a semi-logarithmic scale, and the resulted graph displays a curve representing polarization resistance ($\Delta E/\Delta I$). This graphic relationship of potential-current increments may be used to determine the rate of corrosion of the test electrode subject to corrosion action. However, the polarization resistance relationship is linear only for relatively low values of polarization potential about the test electrode. For example, the polarization potential between like electrodes is usually maintained at 10 millivolt for best results. However, satisfactory results may be obtained with polarization potentials between like electrodes in the range from about 5 to about 25 millivolts. Reference may be taken to the publications of E. J. Simmons, Corrosion, volume 11, pages 225T–260T (1955) and R. V. Skold and T. E. Larson, Corrosion, volume 13, pages 139T–142T (1959) for a description of such determinations. An additional reference may be taken to the article by M. Stern, Corrosion, volume 14, pages 440T–444T (1958) for a discussion as to the determination of corrosion rate from known relationships between polarization potential and the magnitude of applied current which produces polarization resistances.

One type of corrosion rate meter employs the galvanostatic or constant current technique. In such instruments, the corrosion rate is a function of an applied constant current relative to the (current-induced) polarization potential change ($\Delta E$) at the test electrode. Thus, for a fixed value of applied current, the corrosion rate is an inverse function of the change in polarizing potential ($\Delta E$) at the test electrode resulting from the polarizing current increment ($\Delta I$). In corrosion rate meters of the galvanostatic type, the polarization potential ($\Delta E$) is measured to determine the rate of corrosion occurring at the test electrode. Any potential differences such as the freely corroding potential, present between the test specimen electrode and a reference electrode, other than the polarizing potential, produce erroneous results in corrosion rate determinations. More particularly, galvanostatic instruments cannot produce acceptable results unless a correction is made to the measured total potential difference for the freely corroding potential which exists between these electrodes before and also during application of the polarizing current. Additionally, compensation in these instruments for the freely corroding potential must be made without effecting the impedance level between the reference and test electrodes in the corrodent. Otherwise, a constant current would produce variations in polarization potential developed between these electrodes which variations are not related to corrosion action.

Corrosion rate meters of the galvanostatic type may employ a manual adjustment to remove the freely corroding potential from the total potential difference between test and reference electrodes so that only the polarization potential will be the measure of the rate of corrosion occurring at the test electrode. However, rather significant changes in the magnitude of the freely corroding potential, and also the impedance between the reference and test specimen electrodes, can occur during such manual adjustments so that the ultimate accuracy in the measurement of corrosion rate cannot be obtained.

Another problem in galvanostatic types of corrosion rate meters resides in a suitable source of direct current which can provide, at selected intervals, a predetermined, relatively constant current flow between electrodes immersed within a corrodent. The load impedance between these electrodes varies to some unpredictable extent during flow of the direct current. As a result, this load characteristic causes variations in impedance connected to the output of the conventional sources of direct current which produce non-constant current flows between the electrodes and also corresponding variations in polarization potential. Thus, corrosion rate meters, of the galvanostatic type used prior to the present invention, did not obtain maximum accuracy in corrosion rate measurements since their sources of direct current could not produce a relatively constant current at what can be considered infinite output impedance relative to the impedance of the load between the electrodes receiving the applied current flow.

It is the purpose of the present invention to provide a corrosion rate meter which overcomes the above-listed problems, and a galvanostatic electro-chemical technique for its operation, for accurate measurement of corrosion rate of metal surfaces exposed to a corrodent and with completely automatic correction for the freely corroding potential which exists between the reference and test electrodes.

SUMMARY OF THE INVENTION

In accordance with one aspect of this invention, there is provided a corrosion rate meter for determining the rate of corrosion of a metallic material by means of polarization measurements in a corrodent. The meter employs a plurality of metallic electrodes adapted to be placed into contact with a corrodent. A source of direct current passes between at least two electrodes, at selected intervals, a predetermined, relatively constant current. This current produces a polarization potential between one of the electrodes serving as a test specimen and one other of the electrodes. An isolation amplifier, with an input circuit connected between the test specimen electrode and one other of said electrodes, provides in its output circuit an output signal representative of the potential difference between these electrodes. A signal correction means applies a corrective signal to the isolation amplifier for removing, from the output signal, any potential difference component present between the test specimen electrode and the other of the electrodes intermediate the intervals of current flow there-between. A readout means measures the output signal representative of the polarization potential between the test specimen electrode and the one other of the electrodes.

BRIEF DESCRIPTION OF THE DRAWINGS

FIG. 1 is a perspective view of a typical corrosion rate meter probe carrying a plurality of metallic electrodes employed for making corrosion rate measurements; and FIG. 2 is a schematic wiring diagram of one embodiment of corrosion rate meter of this invention.

DESCRIPTION OF SPECIFIC EMBODIMENTS

Referring now to FIG. 1, there is illustrated a probe 11 which carries suitable metallic electrodes for use in the corrosion rate meter of this invention. It is to be understood that other probe and electrode arrangements may be employed for this purpose, if desired. The probe 11 has a plastic body 12, which may be formed of polyethelene, carrying electrically isolated electrodes 13, 14, and 16 which can be immersed in a corrodent. The electrodes 13, 14, and 16 can be formed of steel or any other metallic material. Preferably, the electrodes are structurally identical for purposes of the present electrochemical technique. For example, the electrode 14 is used as the test specimen electrode. The determination of corrosion rate of a certain steel would require this electrode to be made of this particular steel for accurate results in corrosion rate measurements. Electrical conductors (not shown) extend through the body 12 from the electrodes 13, 14, and 16 to an electrical fitting 17 for their respective interconnections to conductors 18, 19, and 21.

For purposes of the present description, the electrode 14 is the test (specimen) electrode, the electrode 13 is the reference electrode, and the electrode 16 is the auxiliary or third electrode. Thus, the probe 11 provides a suitable mounting so that the electrodes may be placed into contact with a corrodent such as by their immersion within a corrosive liquid. It will be apparent that the probe 11 may carry any number of electrodes which by proper switching and electrical connection arrangements provide the necessary functions for carrying out the galvanostatic mode of electro-chemical measurements of corrosion rate.

Referring now to FIG. 2, there is illustrated circuitry of one embodiment of the meter of the present invention which interconnects with two or more suitable electrodes. For example, electrodes 13, 14, and 16 on the probe 11 interconnect via the conductors 18, 19, and 21 to terminals R, T, and A, respectively, of the circuitry. More particularly, the circuitry includes an isolation amplifier 22 with an input circuit connected between the test electrode 14 and the reference electrode 13. The amplifier 22 also has an output circuit in which an output signal is provided representative of the potential difference between electrodes 13 and 14. A signal correction means 23 applies a corrective signal to the isolation amplifier 22. The corrective signal adjusts the output signal from the isolation amplifier 22 to remove therefrom any potential difference component (e.g., the freely corroding potential) present between the electrodes 13 and 14 intermediate intervals of current flow between the electrodes. A readout means 24 connects to the output circuit of the isolation amplifier 22 to measure the output signal representative of the polarization potential between the electrodes 13 and 14. The corrosion rate is readily correlated to the polarization potential. A source of direct current 26 connects to the test electrode 14 and the third electrode 16 for passing, at selected intervals, a predetermined, relatively constant current therebetween. The applied current increment creates the polarization potential between the electrodes 13 and 14.

The isolation amplifier 22 can be arranged as a voltage follower having a high impedance input circuit for isolating the electrodes 13 and 14 from the loading effects of the readout means 24. Preferably, a differential amplifier is used which has a first input 31 and a second input 32 connected, respectively, to the terminals R and T. The input 31 connects to the terminal R through a current limiting resistor 33 that is shunted to a common terminal, or circuit ground, by a parallel circuit formed of resistor 34 and capacitor 36. The resistor 34 and capacitor 36 provide a low-pass filter at the input 31 to reduce noise spikes applied to the amplifier 22. A potentiometer 37 is connected across a source of nulling voltage which may be a battery (not shown) connected across terminals B+ and B−. Moveable arm 38 of the potentiometer 37 applies adjustable zeroing current to the input 31 through a current limiting resistor 39. The arm 38 provides the nulling current which appears on the input 31 to remove any amplifier input current which might flow through the electrode 13. With the electrodes 13, 14 and 16 disconnected from the terminals R, T, and A, the arm 38 on the potentiometer 37 is adjusted for steady state, zero output signal from the amplifier of the signal correction means 23. Thus, input 31 is at zero input current under these conditions and when the amplifier 22 is "nulled."

The amplifier 22 has a feedback circuit connecting the input 32 to the common output 41. More particularly, the feedback circuit includes a resistor 42 shunted by a capacitor 43 to provide high frequency response control. The resistor 42 establishes a suitable gain for the amplifier 22 sufficient to operate the readout means 24. A gain of above about 50,000 in operation of the amplifier 22 will usually be satisfactory for purposes of the present invention. The input 32 is connected through a common impedance, such as resistor 44, to the common terminal for the circuitry, and also to the terminal T. The impedance of resistor 44, in conjunction with the mentioned feedback circuit, provides a common signal path between the input 32 and the terminal T. Thus, the total potential difference between the terminals R and T will appear as a function voltage across the resistor 44.

The output 41 of the amplifier is connected to the readout means 24 that measures the output signal representative of the polarization potential between electrodes 13 and 14. The readout means can consist of an ammeter 46 connected in series with a resistor 47 so that a readout voltage is produced responsive to the output signal from the amplifier 22. The circuit through the ammeter 46 is returned to the common terminal, through a network of resistors 48, 49, and 51. If desired, the present corrosion rate meter can operate in either the cathodic or anodic mode of corrosion rate measurements depending upon directional flow of current between electrodes 14 and 16. For this purpose, the ammeter 46 is connected through a reversing switch 52 which may be of double-pole, double-throw construction. Moving the switch 52 between the two positions causes the terminals of ammeter 46 to be reversed in polarity correlatively to the current flow in the output 41 of the amplifier 22.

The amplifier 22 is connected to a suitable source of current, such as a battery (not shown), connected between terminals 53, and 54, which are designated in polarity as B+ and B—, respectively. A trim resistor 55 may be employed with the amplifier 22 for balancing the static or non-signal voltages which may be present in its associated input-output circuitry.

It will be apparent that with the described input-output circuit arrangement of the amplifier 22, the input signal voltage between the terminals R and T produces a potential differential between the inputs 31 and 32. Aas a result, the amplifier 22 drives to produce an output signal in its output circuit 41 representative of this potential difference. The polarity of the input voltage signal (potential differential) between the inputs 31, and 32 of the amplifier 22 controls the current flow in its output 41 and can produce either a cathodic or anodic polarization potential readout from the circuitry illustrated in the drawings.

If the signal correction means 23 were omitted, the DC feedback circuit of amplifier 22 would produce a finite current as a function of the output voltage signal in the output 41 of the amplifier 22. For example, the freely corroding potential developed between the electrodes 13 and 14 always appears between the terminals R and T of the amplifier 22. The amplifier 22 would drive to produce a certain finite signal in its output 41 which results in a current flow in the resistor 44 reflecting the freely corroding potential. The input signal voltage reaches zero level between the inputs 31 and 32 when the amplifier 22 is in a steady state operation.

In the present embodiment of the corrosion rate meter, a signal correcting means 23 is employed to remove, from the output signal of the amplifier 22, the potential difference component which represents the freely corroding potential. The freely corroding potential is present between electrodes 13 and 14 during the intermediate intervals of current flow which polarizes the electrode 14 to the polarization potential increment relative to the reference electrode 13. Although the removal of the output signal component representing the freely corroding potential can be effected in the output 41 of the amplifier 22, more stable operation is obtained by producing this desired removal in the input circuit. For this purpose, the signal correcting means 23 employs a signal generating means, such as the amplifier 57, which has an output circuit common to the resistor 44 in the input circuit of the amplifier 22. A control signal, which has a predetermined ratio to the output signal from the amplifier 22, is stored in the signal correction means 23. The control signal is applied selectively to the amplifier 57 to provide a certain current flow through the resistor 44. This current flow establishes across resistor 44 of a corrective signal at input 32 of amplifier 22 equal in magnitude to the freely corroding potential present between the test and reference electrodes and applied to the input 31 of the amplifier 22. Since the corrective signal is applied in series with the high input circuit impedance of amplifier 22, no impedance variations are produced at terminals R and T.

More particularly, the amplifier 57 has inputs 58 and 59 and a common output 60, and the usual trim resistor and current supply connected to terminals B+ and B—. The output signal in the output 41 of the amplifier 22 is applied through a network of resistors 61 and 62 to generate the control signal applied to the input 58 of the amplifier 57. The input 58 is shunted to the common terminal through a multidiode bridge 63 and a resistor 64. The bridge 63 and resistor 64 adjust the level of the signal from the output 41 of the differential amplifier 22, and additionally, provide a peak voltage limiter to the input signals applied at the input 58 of the amplifier 57. For example, the bridge 63 can be arranged to have a one volt maximum signal across it. Then, the bridge 63 can limit signal peak levels below this level so as to prevent excursions which distort the output signal from amplifier 57. The input 59 connects via a DC feedback circuit to the output 60 through a control signal storage means such as capacitor 66. Additionally, the input 59 is connected through a signal developing resistor 67 to the common terminal of the circuitry.

The signal correction means 23 is switched between null (lower) and operate (upper) positions. A single-pole, double throw switch 68 can provide for alternately connecting and then isolating the inputs 58 and 59 from the output 41 of the amplifier 22. With the switch 58 in the null position, the output signal from the amplifier 22 is applied through the resistors 61 and 62 forming the control signal at the input 58 of the amplifier 57. The amplifier 57 is driven by this input signal to produce in output circuit 60 an output signal current which creates across resistor 44 a corrective signal equal in magnitude to the freely corroding potential. At this time, current flow through the resistor 67 produces a signal current which is proportional to the output signal of the amplifier 22. This signal current has a value proportional to the input signal voltage at input 58. This signal current is stored as the control signal in the capacitor 66. At this time, the output signal from the amplifier 22 becomes substantially zero in magnitude since the voltage signal inputs across inputs 31 and 32 become zero in magnitude. Also the inputs 58 and 59 of amplifier 57 are reduced to zero input voltage relative to the common terminal. However, the stored control signal in capacitor 66 cannot discharge since (1) the amplifier 57 yet supplies the desired signal current in its output 60 to the resistor 44 and (2) no current can flow in resistor 67 to remove the control signal in capacitor 66. With the switch in operate position, the stored control signal in capacitor 66 regulates the output signal current of the amplifier 57 to produce again a current signal through the resistor 44 to create thereacross a correction signal equal to the freely corroding potential.

With the switch 68 in null position, the corrective signal developed in resistor 44 has an equal magnitude to the freely corroding potential at the input 32. The freely corroding potential appears at input 31 and the corrective signal voltage appears at the input 32 of the amplifier 22. At such time, the output signal in the output 41 becomes zero or substantially so, for practical purposes. The ammeter 46 indicates a zero or minimum output signal level from the amplifier 22 under these conditions.

With the switch 68 in the operate position, the input 58 of the amplifier 57 is reduced to essentially a zero input voltage level since resistor 61 is shunted to the common terminal. At such time, the capacitor 66 applies the stored control signal to input 59. The amplifier 57 again produces an identical signal current flow through the resistor 44 to create the desired corrective signal at input 32 to remove, from the input circuit of amplifier 22, the freely corroding potential which is always present between the terminals R and T.

A small time delay may be needed when the switch 68 is moved from operate to null positions so that any residual polarization potential between electrodes 13 and 14 may decay. Thus, only the freely corroding potential will be present between these electrodes when the switch is placed into the null position.

The switch 68 alternately connects and isolates the inputs of the amplifier 57 from the output circuit 41 of the amplifier 22. As a result, the desired control signal is stored in capacitor 66 and also used to control the output of the amplifier 57 for producing the corrective signal to the input circuit of the amplifier 22 for removing from its output signal the potential difference component representing the freely corroding potential existing between terminals T and R. With the switch 68 in the operate position, the freely corroding potential and the polarization potential are summed at the input 31 of the amplifier 22. However, the amplifier 57 provides a signal current which develops in the resistor 44 a correction signal equal in magnitude to the freely corroding potential. Thus, only the polarization potential is the input signal to the amplifier 22. As a result, the output signal from amplifier 22 is free of any potential difference component which represents the freely corroding potential always present between terminals R and T.

Any source of direct current may provide the polarizing current to be passed between the electrodes 14 and 16 from the terminals A and T in the present corrosion rate meter. There is shown in FIG. 2 an especially unique source of direct current 26 that provides a predetermined, constant current flow with an infinite output impedance relative to any load, such as the load presented at terminals A and T from the electrodes 14 and 16. As a result, the electrical changes in the load by impedance variation in the corrodent between the electrodes 14 and 16 do not influence the supply of current, especially its constant magnitude. Correlatively, no variations occur in the output signal from the amplifier 22 upon changes in the current-induced polarization potential established between the electrodes 13 and 14.

In the source of direct current 26 illustrated in FIG. 2, an impedance balanced electrical bridge 71 has four arms of impedances which may take the form of resistors 72, 73, 74, and 76. A differential amplifier 77 is connected to a suitable source of operating current such as a battery (not shown) connected at terminals 78 and 79. A trim resistor 81 permits setting the static operating condition of the amplifier under zero input conditions. The amplifier 77 has positive and negative inputs 82 and 83, respectively, and a common output 84. The output 84 is connected across opposite corners of the bridge 71 at the junction of resistors 72 and 74, and to the common terminal of the present circuitry. The inputs 82 and 83 are connected to the other opposite corners of the bridge 71 at the junctions of resistors 72 and 73, and resistors 74 and 76, respectively. A capacitor 86 shunts the resistor 74 in the DC feedback circuit between the output 84 and input 83. A source of signal voltage, such as an adjustable voltage source 87, is connected into the resistor 73. However, the signal voltage may be applied at one of the other resistors, if desired. The signal source 87 provides an in-input signal across the inputs 82 and 83 to drive the amplifier 57 to a finite output current from output 84 across the first mentioned opposite corners of the bridge 71. The desired direct current output is taken in an output circuit between a point on either the resistor 72 or the resistor 73 and the output of the amplifier 77. Preferably, the output circuit is taken from a variable tap 75 on the resistor 72 and the common terminal of the bridge 71. The bridge 71 may be constructed of like members so as to be symmetrical in respect to component voltages and currents in respective arm pairs. However, other bridge arrangements may be used as long as the amplifier 77 can introduce sufficient current into the bridge 71 to bring the inputs 82 and 83 to zero signal conditions.

A switch 88 in the current output circuit from the variable tap 75 allows the output circuit to be removed from the Terminal A (and the third electrode 16) while the signal correction means 23 is being nulled. For this purpose, the switch 88 passes the output current from the bridge 71 through a load resistor 89 to the common terminal. The resistor 89 provides a relatively high load impedance which is comparable to the load impedance between the electrodes 14 and 16 when immersed in the corrodent. An ammeter 91 may be connected in series with the arm 75 and switch 88 to monitor output current from the bridge 71. This arrangement permits the current supplied by the bridge 71 to be preset to any desired value before it is passed between electrodes 14 and 16.

The operation of the bridge 71 may be more easily understood by first considering conditions where no current passes through tap 75 and the signal source 87 provides zero signal voltage in the resistor 73. At these conditions, the amplifier 77 must drive until current flow in output 84 balances the bridge, i.e., voltage ratios in resistors 72 and 73 are equal to resistors 74 and 76, and a zero input signal appears across inputs 82 and 83. If tap 75 were connected to a load, no current could flow through ammeter 91 since the amplifier 77 would adjust current flow into bridge 71 so that the inputs 82 and 83 return again to zero signal conditions. Thus, the bridge 71 provides at these conditions an infinite output impedance at zero output current.

Now, the signal source 87 is adjusted to provide a signal voltage in resistor 73. The amplifier 77 cannot adjust current in output 84 to rebalance the bridge 71 since there is an external voltage unbalance between the respective arm pairs of resistors 72 and 73. However, connection of the tap 75 to a load impedance, such as terminal A or load resistor 89, permits a current flow to or from (depending on polarity) the bridge 71 through that portion 72a of resistor 72 between tap 75 and the junction between resistors 72 and 74. It will be apparent for the bridge 71 to be balanced that the current flow through portion 72a of resistor 72 must develop a voltage equal to the voltage signal in resistor 73 provided by signal source 87. Then, the inputs 82 and 83 will be at zero signal conditions. Thus, the amplifier 77 provides the constant current selected by setting tap 75 to a load while the signal source sets the range of currents available to the load. Under these conditions, the impedance of the load does not effect the supply of current which is soley the function of the signal voltage applied to resistor 73 and the setting of tap 75 on resistor 72. Hence, the current source 26 provides a constant, predetermined current, to any load at infinite impedance conditions.

As a result, the selected magnitude of output current flow is provided to terminal A irrespective of impedance variations between the electrodes 14 and 16.

The readout of polarization potential produced in the ammeter 46 is a non-linear scale function. The basic corrosion rate equation may be expressed as $CR = k \times I/E$: wherein I is the test electrode polarizing current; E is the change in test electrode polarization potential resulting from the polarizing current; and $k$ is an instrument constant. The polarization potential readings upon ammeter 46 are inversely proportional to the corrosion rate for values of polarization potential (E) up to approximately 20 millivolts. Thus, the readings of polarizing potential (E) on the ammeter 46 are inverse to the corrosion rate occurring at the electrode 14. However, the exact corrosion rate for a certain test electrode may be calculated by calibration of the ammeter 46 for a full scale range unit in MPY values (mils per year). The particular scale value read from the ammeter (when switch 68 is in operate position) multiplied times the full scale range unit of such ammeter is corrosion rate. For example, if the full scale range unit is 200 MPY and the particular scale value is 0.42 on the ammeter 46, the corrosion rate is 200×0.42 or 84 MPY. Other arrangements for producing a readout of the polarizing potential and/or converting the same to corrosion rate measurements may be employed as may be apparent to those skilled in the art.

With the present embodiment of this invention, it may be desirable to provide several ranges of corrective signal to be applied to input 32. For this purpose, a shunting resistance, such as resistor 91, across resistor 44 provides a change in correction signal applied to input 32. A switch 92 removes the shunting resistor 91 from the common terminal to output 60 when it is desired to change the range of the corrective signal. The impedance of output 60 is essentially zero. The switch 92 is shown in the lower range position. Switching the resistor 91 between the common terminal and output 60 does not change the impedance of the input 32 of the amplifier 22. Thus, the resistor 91 remains in effective connection to the input 32 without any change in impedance.

The output from the present corrosion rate meter may be applied to a recorder (not shown). For this purpose, a first recorder output 93 is taken from the junction of resistors 49 and 51 which are connected in the circuit associated with ammeter 46. These resistors provide for impedance matching of one recorder output to the output 41 of the amplifier 22. An additional recorder output is taken from the junction of resistors 94 and 96 connected between the output 41 of amplifier 22 and the common terminal in the present corrosion rate meter. A switch 97 disconnects the recorder during nulling operations. For this purpose, the switch 97 is moved to a null (lower) position so that the recorder output is connected to the output circuit of the amplifier 57 at the junction of resistors 98 and 99. If desired, the operation of switches 68, 88 and 97 may be ganged for simultaneous movement between null and operate positions and if desired, in an intermediate position to allow the polarization potential to decay. It will be apparent that the networks of resistors associated with the switch 97 are voltage dividers to maintain constant output impedance in the recorder circuit in either null and operate positions.

It will be apparent that the circuitry illustrated in FIG. 2 may be operated with any number of electrodes as long as the polarization potential generated between at least two electrodes is applied between terminals R and T to the amplifier 22. The source of current for producing this polarization potential may come from another electrode or from any suitable source of current through the corrodent, to the test electrode 14.

Various modifications and alterations in the described corrosion rate meter, and subcombinations thereof, will be apparent to those skilled in the art from the foregoing description which do not depart from the spirit of the invention. For this reason, these changes in structure are desired to be included within the scope of the present invention. The appended claims define the present invention; the foregoing description is to be employed for setting forth the specific embodiments as illustrative in nature.

What is claimed is:

1. A meter for determining the rate of corrosion of a metallic material by means of polarization measurements in a corrodent which comprises:
    (a) a plurality of metallic electrodes adapted to be placed into contact with a corrodent, said electrodes being a reference electrode, a test specimen electrode and a third electrode;
    (b) a source of direct current connected to said test specimen and third electrodes for passing therebetween, at selected intervals, a predetermined relatively constant current whereby a polarization potential is created between said test specimen and reference electrodes;
    (c) an isolation amplifier having an input circuit connected between said test specimen and reference electrodes for providing in its output circuit an output signal representative of the potential difference between said test specimen and reference electrodes;
    (d) signal correction means associated with said isolation amplifier to apply a corrective signal thereto, said corrective signal adjusting the output signal from said isolation amplifier to remove therefrom any potential difference component present between said test specimen and reference electrodes between intervals of current flow between said test specimen and third electrodes; and
    (e) readout means connected to said isolation amplifier to measure the output signal representative of the polarization potential between said test specimen and reference electrodes.

2. The meter of claim 1, wherein said signal correction means includes a signal correction amplifier having input and output circuits connected to the output and input circuits of said isolation amplifier, respectively, a feedback circuit between the input and output of said signal correction amplifier including capacitance means for storing a control signal having a predetermined ratio to the output signal from said isolation amplifier means for isolating said input circuit of said signal correction amplifier from said output circuit of said isolation amplifier during intervals when current passes between said test specimen and third electrodes, said output circuit of said signal correction amplifier including an impedance in the input circuit of said isolation amplifier which produces a corrective signal therein for adjusting the output signal from said isolation amplifier for any potential difference present between said test specimen and reference electrodes between intervals of current passage creating the polarization potential between said test specimen and reference electrodes.

3. The meter of claim 1 wherein said signal correction means includes a means to store a control signal having a predetermined ratio to the output signal from said isolation amplifier, a signal generating means having an output circuit with an impedance common to the input circuit of said isolation amplifier, and said signal generating means responsive to said control signal providing in said impedance a corrective signal equal in magnitude to any potential difference present between said test specimen and reference electrodes during intervals when current passage creates a polarization potential between said test specimen and reference electrodes.

4. The meter of claim 1 wherein said source of direct current provides a flow of discrete current at infinite output impedance between said test specimen and third electrodes.

5. The meter of claim 1 wherein said source of direct current comprises a differential amplifier having positive and negative inputs and connected to a direct current supply means, said inputs connected across opposite corners of a four arm impedance balanced electrical bridge, an output circuit of said differential amplifier connected in a feedback circuit between the other oppoiste corners of said bridge, and a source of signal voltage connected into at least one of the arms of said bridge, and an output circuit from said bridge connected between said output circuit of said differential amplifier and to a point on an arm which connects to both said output circuit and said positive input of said differential amplifier.

6. A meter for determining the rate of corrosion of a metallic material by means of polarization measurements in a corrodent which comprises:
  (a) a plurality of metallic electrodes of substantially equal size adapted to be placed into contact with a corrodent, said electrodes being a test specimen electrode formed of the metallic material to be tested, a reference electrode and a third electrode;
  (b) a source of direct current connected to said test specimen electrode and said third electrode for passing therebetween, at selected intervals, a predetermined relatively constant current whereby a polarization potential is created between said test specimen and reference electrodes;
  (c) an isolation amplifier having an input circuit connected between said test specimen electrode and said reference electrode for providing in its output circuit an output signal representative of the potential difference between said test specimen and reference electrodes;
  (d) signal correction means connected to said isolation amplifier to apply a corrective signal thereto, said corrective signal adjusting the output signal from said isolation amplifier to remove therefrom any potential difference component present between said test specimen and reference electrodes between intervals of current flow between said test specimen and third electrodes; and
  (e) a readout means connected to said output circuit of said isolation amplifier to measure the output signal representative of the polarization potential between said test specimen electrode and reference electrode during intervals of current flow between said test specimen and third electrodes.

7. The meter of claim 6, wherein said signal correction means includes a signal correction amplifier having input and output circuits connected to the output and input circuits of said isolation amplifier, respectively, a feedback circuit between the input and output of said signal correction amplifier including capacitance means for storing a control signal having a predetermined ratio to the output signal from said isolation amplifier, means for isolating said input circuit of said signal correction amplifier from said output circuit of said isolation amplifier during intervals when current passes between said test specimen and third electrodes, said output circuit of said signal correction amplifier including an impedance in the input circuit of said isolation amplifier which produces a corrective signal therein for adjusting the output signal from said isolation amylifier to remove therefrom any potential difference component present between said test specimen and reference electrodes between intervals of current passage creating the polarization potential between said test specimen and reference electrodes.

8. The meter of claim 6 wherein said signal correction means includes a means to store a control signal having a predetermined ratio to the output signal from said isolation amplifier, a signal generating means having an output circuit with an impedance common to the input circuit of said isolation amplifier, and said signal generating means responsive to said control signal providing in said impedance a corrective signal equal in magnitude to any potential difference present between said test specimen and reference electrodes between intervals when current passage creates a polarization potential between said test specimen and reference electrodes.

9. The meter of claim 6 wherein said source of direct current provides a flow of discrete current at infinite output impedance between said test specimen and third electrodes.

10. The meter of claim 6 wherein said source of direct current comprises a differential amplifier having positive and negative inputs and connected to a direct current supply means said inputs connected across opposite corners of a four arm impedance balanced electrical bridge, an output circiut of said differential amplifier connected in a feedback circuit between the other opposite corners of said bridge, and a source of signal voltage connected into at least one of the arms of said bridge, and an output circuit from said bridge connected between said output circuit of said differential amplifier and to a point on an arm which connects to both said output circuit and said positive input of said differential amplifier.

11. The meter of claim 6 wherein said signal correction means includes a differential amplifier having first and second imputs and a common output, a feedback circuit including a capacitance means between the first input and the output of said differential amplifier, means for alternately connecting and then isolating said second input of said differential amplifier to the output circuit of said isolation amplifier through a first impedance for storing in said capacitance a control signal which has a predetermined ratio to the output signal of said isolation amplifier, said output circuit of said differential amplifier including an impedance in the input circuit of said isolaton amplfier to produce a corrective signal theerin for adjusting the output signal from said isolation amplifier to remove therefrom any potential differential component present between said test specimen and reference electrodes between intervals of current passage creating the polarization potential between said test specimen and reference electrodes.

References Cited
UNITED STATES PATENTS 2,759,887   8/1956   Miles _____ 204—196
3,406,101   10/1968  Kilpatrick _____ 204—195

TA-HSUNG TUNG, Primary Examiner

U.S. Cl. X.R.
204—1 T; 324—71 C